(12) United States Patent
Cazier

(10) Patent No.: US 7,143,114 B2
(45) Date of Patent: Nov. 28, 2006

(54) AUTOMATIC RENAMING OF FILES DURING FILE MANAGEMENT

(75) Inventor: Robert Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 10/126,079

(22) Filed: Apr. 18, 2002

(65) Prior Publication Data

US 2003/0200229 A1 Oct. 23, 2003

(51) Int. Cl.
G06F 17/30 (2006.01)
G06F 12/00 (2006.01)

(52) U.S. Cl. .................................................. 707/200

(58) Field of Classification Search ................ 707/205, 707/200, 1–6
See application file for complete search history.

(56) References Cited

U.S. PATENT DOCUMENTS

| | | | | |
|---|---|---|---|---|
| 5,757,958 A | * | 5/1998 | Shimizu et al. | 382/181 |
| 6,065,015 A | * | 5/2000 | Kazami | 707/104.1 |
| 6,260,040 B1 | * | 7/2001 | Kauffman et al. | 707/200 |
| 6,418,234 B1 | * | 7/2002 | Whited | 382/110 |
| 2001/0040695 A1 | * | 11/2001 | Manowitz | 358/1.15 |
| 2002/0093582 A1 | * | 7/2002 | Aoki et al. | 348/333.02 |
| 2002/0133515 A1 | * | 9/2002 | Kagle et al. | 715/511 |

OTHER PUBLICATIONS

Microsoft Windows NT.*

* cited by examiner

*Primary Examiner*—Jack M Choules

(57) ABSTRACT

A data management system can improve the saving and transferring of data files by automatically renaming new data files when transferring files from a source location to a destination location. The data files would be renamed when the duplicate name is for a file that contains different data.

40 Claims, 3 Drawing Sheets

AUTOMATIC RENAMING OF FILES DURING FILE MANAGEMENT

FIELD OF THE INVENTION

The field of this invention relates to data management and more specifically to automatic renaming of data files during the transfer of the files from one location to another location.

BACKGROUND OF THE INVENTION

Digital cameras create a large number of files. These files can be audio files, thumbnails or full digital images. Currently these files are named based on a default name given by the camera manufacture, for example DSC00001.jpg. Most digital cameras today can store a large number of these images. After taking pictures the camera may contain a list of these files with names that start at the default name and increment upward, for example DSC00001.jpg, DSC00002.jpg, DSC00003.jpg, DSC00004.jpg etc. The sequential nature of the typical camera naming scheme is chosen such that the files are displayed in the order they were taken when the images are sorted by their file names.

Once the storage area on the camera is full the users must transfer the images to a computer or other storage device. Or the user can swap in an empty storage device if the camera has removable storage, for example a memory stick or a floppy disk. When all the images have been removed or an empty removable storage device is inserted into the camera, the name of the next image captured may be reset to start at the default name (i.e. DSC00001.jpg). Other cameras only reset to the default name when a "rollover" of the naming scheme occurs, for example after the DSC99999.jpg image is saved.

When the user transfers the image files to a computer, the files are stored typically at one level or in one folder that contains all the user's images. When the user moves the new images to the same directory the file names may be duplicates of file names saved previously. The new images with duplicate names may be caused by the camera resetting the names to the default starting name, or by using multiple cameras having the same naming scheme, or by a "rollover" of the naming scheme in a single camera. Transferring images with duplicate names can cause problems such as overwriting previously saved images that the user may wish to keep.

Some cameras allow the user to rename the file but with the limited user interface available on most digital cameras, renaming the file is difficult and time consuming.

Today when the Windows Operating System™ is used to move files, commonly named files are detected but the user is only given the option of overwriting the file at the destination location or canceling the transfer.

There is a need for a system that can automatically rename the files when duplicated file names are detected.

SUMMARY OF THE INVENTION

A data management system can improve the saving and transferring of data files by automatically renaming new data files when transferring files from a source location to a destination location. The data files would be renamed when the duplicate name is for a file that contains different data.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
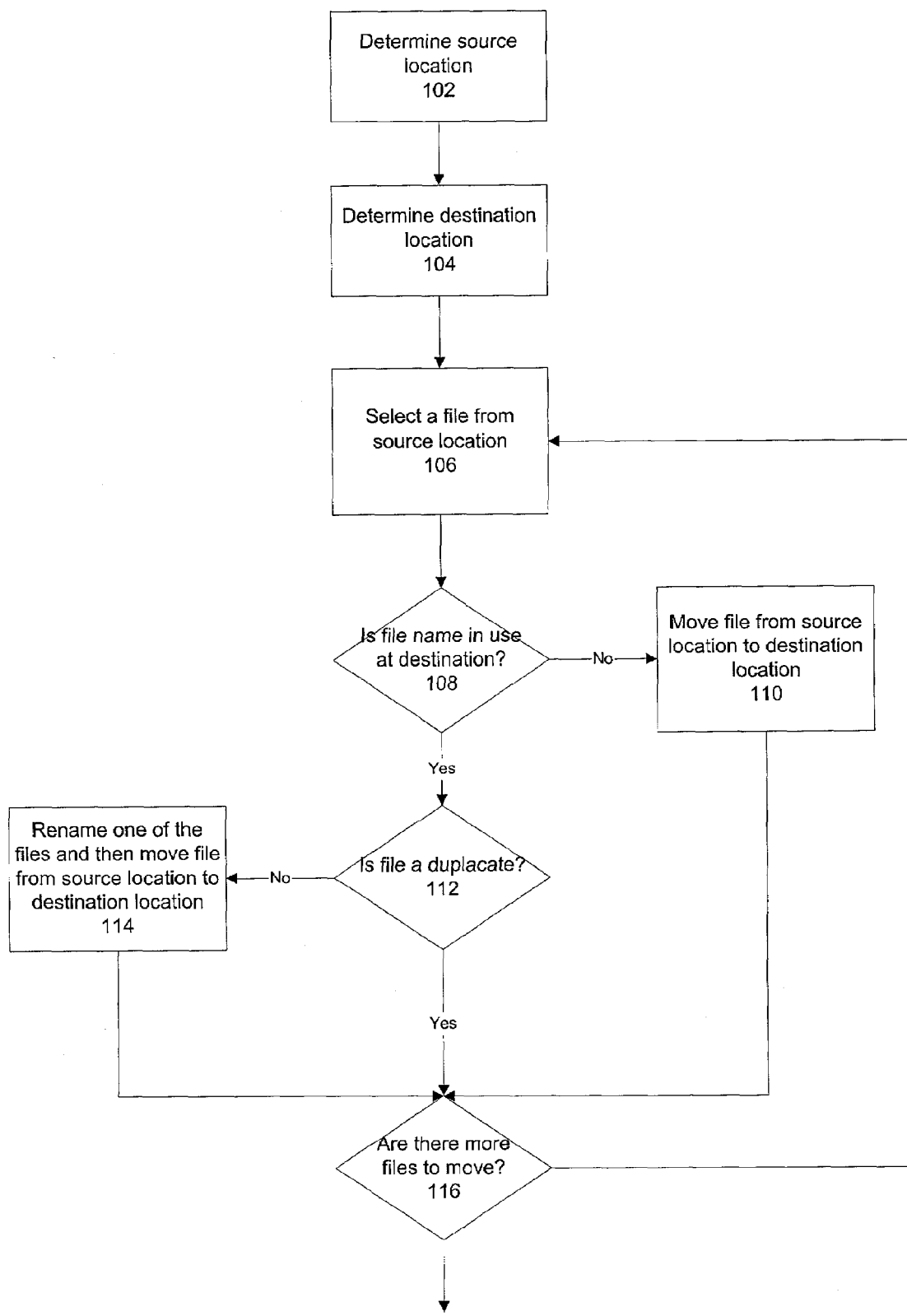
FIG. 1 is a flow chart for renaming non-duplicate data files in accordance with one embodiment of the present invention.
Figure 2:
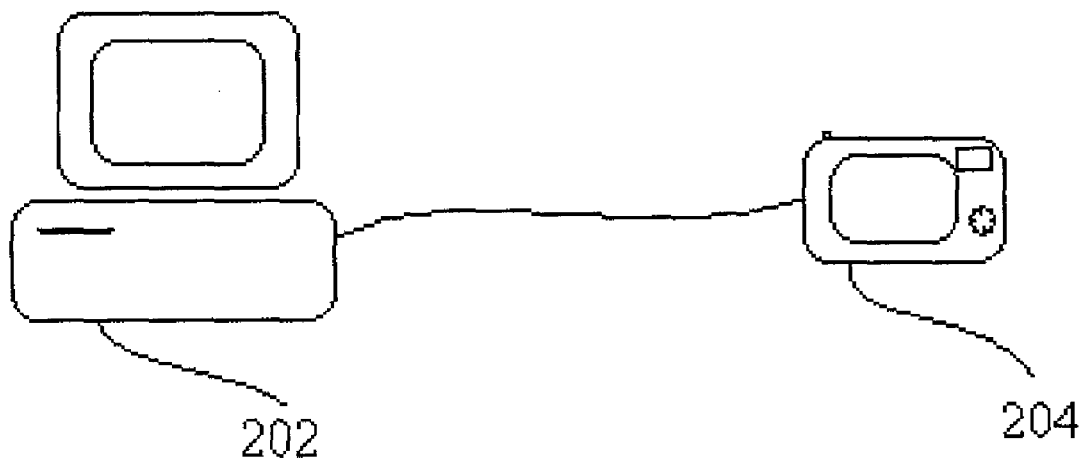
FIG. 2 is a block diagram for a system that transfers files from a camera to a computer in accordance with one embodiment of the present invention.
Figure 3:
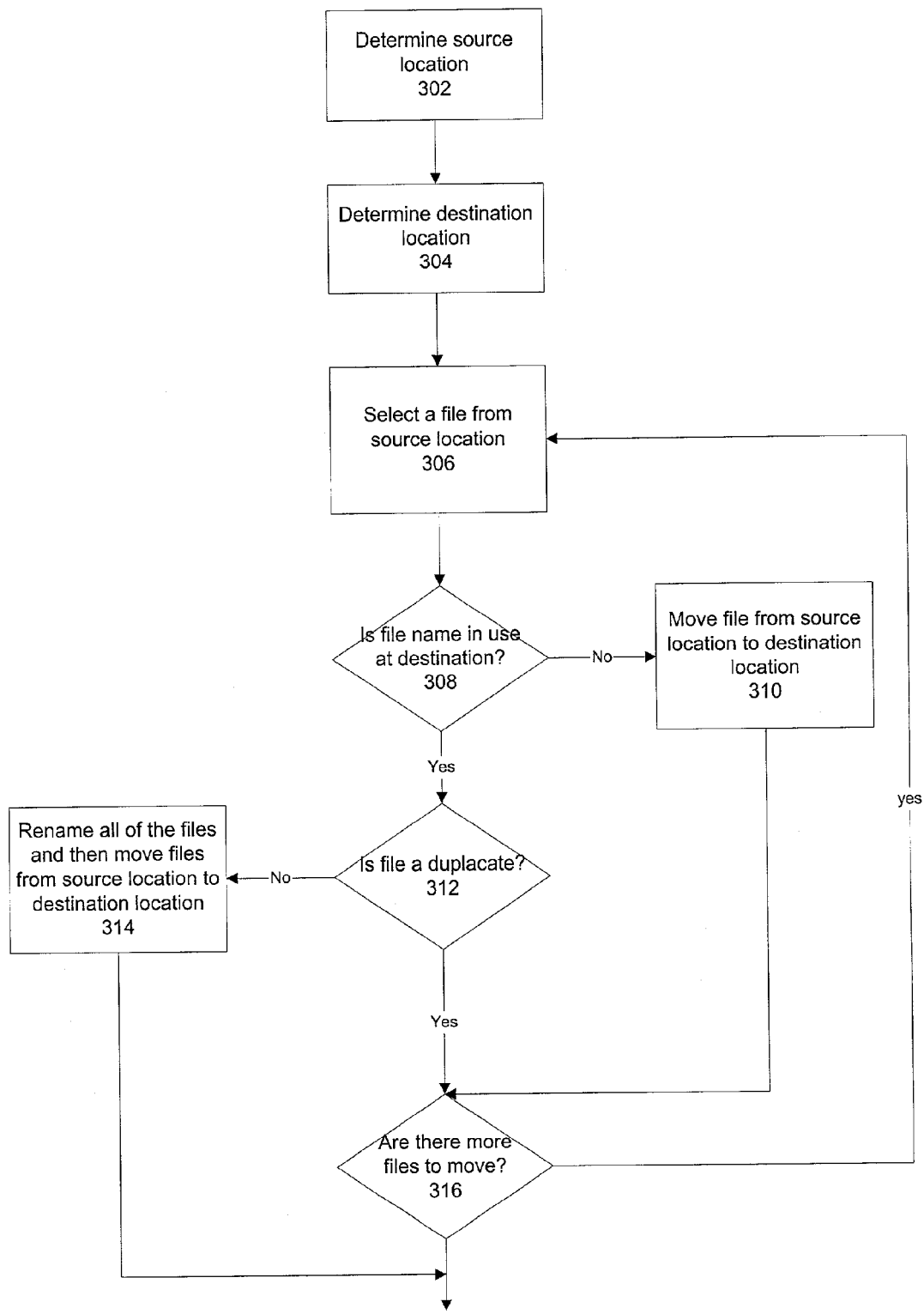
FIG. 3 is a flow chart for renaming all data files when a non-duplicate file is detected in accordance with one embodiment of the present invention.

A system that can rename non-duplicate image files can enhance the ability to transfer image files to more permanent image storage devices.

Digital cameras today typically have a storage area for storing image files created by the camera. Some cameras use removable storage areas, for example a floppy disc or a memory card. Typically all the image files are stored at one level in the same directory. When a user connects the camera or storage area to a computer or the Internet, the files are typically moved into one folder or sub-directory. A user can manually move individual files or images or groups of files into separate subdirectories, but with the number of images a typical camera can store, this is a tedious process.

An image file typically contains more information than just the raw image data. This additional data is typically called meta-data. Most image files also contain the time and date the file was created. Many image files also contain information about the image, for example the resolution of the image, the exposure settings used to capture the image, whether the image has been compressed, and if so how much compression was used. Some cameras contain global positioning systems (GPS) and include, in the image file, the location the file was created. The global positioning system (GPS) is a system that allows a GPS device to determine the longitude and latitude of the device to within approximately 3 meters, anywhere in the world. Today some digital cameras have GPS auxiliary devices that allow the digital camera to embed the longitude and latitude information into the image or save the longitude and latitude as meta-data in the image file. There are many other types of information that can be included in an image file, the examples given are for ease of understanding and do not limit the invention to the types of information used in the examples.

As the user continues to capture images and save them onto a more permanent storage device, for example a computer or the Internet, the user may end up with different images having the same file name. This can cause one image to overwrite the other image when transferring the images between devices or between directories on the same device.

Image file transfers from a camera can be initiated in a number of ways. Some cameras require the user to drag-and-drop the images from the camera into a file structure on the receiving device. Other cameras automatically initiate file transfers when the camera is mounted in a camera dock. Yet other cameras start file transfers when a connection to the Internet is detected. Image files are also transferred between directories on a common device, for example a computer. In each of these cases a system moves image files from a source location to a destination location.

In one embodiment of the current invention, when an image file is transferred from one device (204) to another device (202), or from one directory to another directory on the same device, the system will check the names of the files being transferred with the names of the files already at the destination location (108). When the system determines that a file name is a duplicate of a file name at the destination location, the system will check to see if it is the same file or a different file (112). When it is a different file with a duplicate name, the system will automatically rename one of the files to a name not already in use in the directory (114). The system may optionally display or print a message to the user informing the user the old and new name of the file that was renamed. The system may also be optionally configured to allow the user to choose the new name, or approve the name chosen by the system. The system can be programmed to rename the file in the destination location or to rename the transferred file.

Using the above embodiment of the current invention, renamed files may lose their position in the sequential display order of photos taken. In this application sequential display order is defined as a sequence of files that maintain the same order when sorted by their file names or when sorted by their time of creation. For example, let's say you have 4 images (a001.jpg, a002.jpg, a003.jpg and a004.jpg) in a source location that were taken on February $4^{th}$ with image a001.jpg taken first and image a004.jpg taken last. When transferring these files to a destination location that contains an image, taken on February $1^{st}$, already named a002.jpg, the file a002.jpg from the source location could be renamed. Let's assume the image a002.jpg from the source location is renamed b002.jpg. When this group of images is displayed using a file system that sorts by the name of the file, the order of the images displayed would be as follows:

a001.jpg taken February $4^{th}$,
a002.jpg taken February $1^{st}$,
a003.jpg taken February $4^{th}$,
a004.jpg taken February $4^{th}$,
b002.jpg taken February $4^{th}$.

The order of the files displayed does not correspond to the order the photos were taken. This may cause the user to have difficulty finding images.

In another embodiment of the current invention, when a duplicate name is detected (312), all the files being transferred are renamed (314). The transferred files are renamed in such a way as to maintain the sequential display order. Using the example above, the 4 files being transferred would be renamed such that the resulting files would be as follows:

a002.jpg taken February $1^{st}$,
b001.jpg taken February $4^{th}$,
b002.jpg taken February $4^{th}$,
b003.jpg taken February $4^{th}$,
b004.jpg taken February $4^{th}$.

Using this embodiment, the files transferred from the source location would retain their sequential time based order when sorted by file name. Changing the first letter in the file name is only an example of a way to change the file names. There are many ways to change file names and retain their sequential display order and this invention is not limited to only changing the first letter.

In another embodiment of the current invention, when a duplicate file name is detected, all the files in the destination location are renamed. The renaming is done in such a way as to preserve the sequential time based order when sorting by file names. Renaming the files in the destination location may be more difficult than renaming files from a source location when the source location is the digital camera. This is because there may be more than one sequence of file names at the destination location as compared to typically a single sequence on the digital camera.

There are a number of ways that can be used to determine when an image is a duplicate image or when the image is a different image with a duplicate name. One way is to compare one or more of the pieces of meta-data stored in the file, for example the time the file was created. If the meta-data is different between the two files then the images are probably different images with a common file name. The time the file was created may not be the best piece of meta-data to use because this data may be changed when the file is copied. The size of the image is another piece of meta-data that may not be optimal. Because most cameras have a number of predefined resolutions, many of the image files will be the same size. When the camera has a GPS device, the location the image was captured may be a very useful piece of meta-date to compare the files with. A combination of meta-data may be the best way to quickly compare files, for example the location and time an image was captured.

In another embodiment of the current invention, the image data between the two commonly named files is compared. Using the image data to compare the two files is the most accurate way to determine if the images are duplicates. However using the image data may also be one of the slowest ways to compare the files. There are many methods, well known in the arts, to determine if two images are the same. When the commonly named files contain different images, one of the files will be renamed to a different name, not currently in use in the destination location.

In another embodiment of the current invention both the meta-data and the image data is used to compare the commonly named files. Using both the image data and the meta-data can help differentiate between two images of the same scene. For example when a user takes two images of the same scene, the time the images were created will be different.

The embodiments of the current invention described above used image files as examples of the types of files being moved from a source location to a destination location. This invention is not limited to image files, other types of files would benefit from this invention. Almost any type of file can be compared to detect if it is a true duplicate or if it is a different file with the same name. Because of the mechanical naming process used in digital cameras and the large number of files created, this invention may be most beneficial for digital image files.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of transferring a data file, the data file comprising image data, the method comprising:
determining a source location, the source location comprising a first data file;
determining a destination location, the destination location comprising a second data file, the second data file comprising image data;
comparing the first data file to the second data file;
moving the first data file from the source location to the destination location; and
renaming the first data file when the second data file has the same file name, and when the image data portion of the first data file is not the same as the image data portion of the second data file.

2. The method of claim 1, wherein the source location is associated with a camera.

3. The method of claim 1, wherein the source location and destination location are associated with the same device.

4. The method of claim 1, wherein the source location and destination location are associated with different devices.

5. The method of claim 1, wherein the image data is representative of at least one digital image.

6. The method of claim 5, wherein the data files comprise meta-data, and wherein the comparing comprises comparing at least a portion of the meta-data to determine if the data files are different.

7. The method of claim 5, wherein the comparing comprises comparing at least a portion of the image data to determine if the data files are different.

8. The method of claim 5, wherein the comparing comprises comparing the image data and the meta-data to determine if the data files are different.

9. The method of claim 1, wherein a user is prompted to rename the first data file when the first data file and the second data file have the same name.

10. The method of claim 1, wherein the original name and the new name of the data file that was renamed are presented to a user.

11. A method of transferring data, the method comprising:
determining a source location, the source location having a first data file associated therewith, the first data file having first data associated therewith, the first data file having a first file name;
determining a destination location, the destination location having one second data file stored therein, the second data file having second data associated therewith, the second data file having a second file name;
comparing the first data to the second data;
moving the first data file from the source location to the destination location; and
renaming the second data file when the first data file has the same file name as the second data file and when the first data and the second data are not the same.

12. The method of claim 11, wherein the destination location Is associated with a computer.

13. The method of claim 11, wherein the first and second data are representative of electronic images.

14. The method of claim 13, wherein the first data and the second data comprise image data.

15. The method of claim 11, wherein the source location and the destination location are both associated with the same device.

16. The method of claim 11, wherein the source location and destination location are associated with different devices.

17. A system for transferring image files comprising:
a source location and a destination location;
at least one first image file at the source location, the first image file having a first file name, wherein at east one first image is represented by the first image file;
at least one second image file at the destination location, the at least one second image file having a second file name, wherein at least one second image is represented by the second image file;
a processor configured to transfer image files the source location to the destination location; compare the first image fife to the second image file; and rename either the first image file or the second image file when the first name is the same name as the second name and the at least one first image is different than the at least one second image.

18. The system of claim 17, wherein the at least one first image file and the at least one second image file have meta-data associated therewith, and wherein comparisons of both the meta-data and the image data are used to determine if the at least one first image is different that the at least one second image.

19. The system of claim 17, wherein both the source location and the destination location are associated with a single computer.

20. A system for transferring image files, the image files having image data associated therewith, the system comprising:
a source location and a destination location;
at least one first image file at the source location, one of the at least one first image files having a first file name;
at least one second image file at the destination location, one of the at least one second image files having a second file name;
a means for comparing the first image file to the second image file;
a means for transferring the first image file to the destination location;
a means for renaming the second image file when the first file name has the same name as the second file name and when image data associated with the first image file is different then image data associated with the second image file.

21. The system of claim 20, wherein the source location is associated with a camera.

22. The system of claim 20, wherein the source location and destination location are associated with a single device.

23. The system of claim 20, wherein the source location and destination location are associated with different devices.

24. The system of claim 20, wherein the at least one first image file and the at least one second image file have meta-data associated therewith, and wherein the means for comparing comprises a means for comparing meta-data associated with the image files to determine if the image files are different.

25. The system of claim 20, wherein the at least one first image file and the at least one second image file have image data associated therewith, and wherein the means for comparing comprises a means for comparing image data associated with the image files is used to determine if the image files are different.

26. The system of claim 20, wherein the at least one first image file and the at least one second image file have meta-data and image data associated therewith, and wherein the means for comparing comprises a means for comparing the image data and the meta-data are used to determine if the image files are different.

27. The system of claim 20, wherein a user is prompted to rename the first image file being transferred.

28. The system of claim 20, wherein the original name and the new name of each image file that is to be renamed is presented to a user.

29. A method of transferring data files, the method comprising:
   determining a source location, the source location having a first data file, the first data file having a first file name;
   determining a destination location, the destination location having at least one second-data file, the second data files located at the destination location having a sequence associated therewith;
   moving the first data file from the source location to the destination location;
   comparing the first data file to the at least one second data file; and
   renaming at least one of the second data files at the destination location, such that the sequence is preserved, when a second data file at the destination location has the same file name as the first data file, and when the first data file and the second data file are different.

30. The method of claim 29, wherein the data files are representative of digital images.

31. The method of claim 30, wherein the data files have meta-data associated therewith, and wherein the comparing comprises comparing the meta-data to determine if the data files are different.

32. The method of claim 30, wherein the data files have image data associated therewith, and wherein the comparing comprises comparing the image data associated with the data files to determine if the data files are different.

33. The method of claim 30, wherein the data files have image data and meta-data associated therewith, and wherein the comparing comprises comparing the image data and the meta-data to determine if the data files are different.

34. The method of claim 29, wherein the original name and the new name of each data file that is to be renamed is presented to a user.

35. A method of transferring data, the method comprising:
   determining a source location, said source location having at least one first data file, each of said first data files having a file name;
   determining a destination location, the destination location having at least one second data file, wherein each second data file at the destination location has a file name, said second data files having a sequence associated therewith;
   transferring at least one first data file from the source location to the destination location;
   comparing the file name of each first data file transferred from the source location with the file name of each second data file at the destination location;
   comparing the data of each first data file transferred from the source location with the data of each second data file at the destination location; and
   renaming all the first data files transferred from the source location in such a way as to maintain the sequence when any of the transferred files have the same file name as any of the second data files located at the destination location, and when the data of a first data file and the data of a second data file are different.

36. The method of claim 35, wherein the data files are representative of digital images.

37. The method of claim 36, wherein the data files have meta-data associated therewith, and wherein the comparing comprises comparing the meta-data to determine if the data files are different.

38. The method of claim 36, wherein the data files have image data associated therewith, and wherein the comparing comprises comparing the image data to determine if the data files are different.

39. The method of claim 36, wherein the data files have image data and meta-data associated therewith, and wherein the comparing comprises comparing the image data and the meta-data to determine if the data files are different.

40. The method of claim 35, wherein the original name and the new name of each data file that is to be renamed is presented to a user.

* * * * *

UNITED STATES PATENT AND TRADEMARK OFFICE
CERTIFICATE OF CORRECTION

PATENT NO.          : 7,143,114 B2                                            Page 1 of 1
APPLICATION NO. : 10/126079
DATED               : November 28, 2006
INVENTOR(S)         : Robert Cazier It is certified that error appears in the above-identified patent and that said Letters Patent is hereby corrected as shown below:

In column 5, line 57, in Claim 12, delete "Is" and insert -- is --, therefor.

In column 6, line 4, in Claim 17, delete "east" and insert -- least --, therefor.

In column 6, line 10, in Claim 17, after "files" insert -- from --.

In column 6, line 12, in Claim 17, delete "fife" and insert -- file --, therefor.

In column 6, line 22, in Claim 18, delete "that" and insert -- than --, therefor.

In column 6, line 43, in Claim 20, delete "then" and insert -- than --, therefor.

Signed and Sealed this

Fifth Day of May, 2009

JOHN DOLL
*Acting Director of the United States Patent and Trademark Office*